(12) United States Patent
Sarro

(10) Patent No.: US 8,092,950 B2
(45) Date of Patent: Jan. 10, 2012

(54) TUBULAR FUEL CELL MODULE AND THE SEALING DEVICE THEREOF

(75) Inventor: Jean-Luc Sarro, Bourg Saint Andeol (FR)

(73) Assignee: Commissariat a l'Energie Atomique (FR)

( * ) Notice: Subject to any disclaimer, the term of this patent is extended or adjusted under 35 U.S.C. 154(b) by 806 days.

(21) Appl. No.: 12/089,110

(22) PCT Filed: Oct. 17, 2006

(86) PCT No.: PCT/EP2006/067500
§ 371 (c)(1),
(2), (4) Date: Apr. 3, 2008

(87) PCT Pub. No.: WO2007/045652
PCT Pub. Date: Apr. 26, 2007

(65) Prior Publication Data
US 2008/0233463 A1    Sep. 25, 2008

(30) Foreign Application Priority Data

Oct. 19, 2005   (FR) ..................................... 05 53180

(51) Int. Cl.
*H01M 2/08* (2006.01)
*H01M 8/02* (2006.01)

(52) U.S. Cl. ....................................... 429/460; 429/469
(58) Field of Classification Search ................... 429/460, 429/466, 469
See application file for complete search history.

(56) References Cited

U.S. PATENT DOCUMENTS

| | | | | |
|---|---|---|---|---|
| 5,244,752 | A | * | 9/1993 | Zymboly .................. 429/466 X |
| 5,338,623 | A | * | 8/1994 | Nachlas et al. ........... 429/466 X |
| 5,399,442 | A | | 3/1995 | Shundo |
| 6,001,501 | A | * | 12/1999 | Collie ....................... 429/469 X |
| 6,291,089 | B1 | | 9/2001 | Piascik et al. |
| 6,670,068 | B1 | | 12/2003 | Diez |
| 7,229,712 | B2 | * | 6/2007 | Eshraghi et al. .............. 429/466 |

FOREIGN PATENT DOCUMENTS

WO    WO 96/04691    2/1996

* cited by examiner

*Primary Examiner* — Stephen J. Kalafut
(74) *Attorney, Agent, or Firm* — Baker & Hostetler LLP

(57) ABSTRACT

The module comprises a reinforced sealing device at the outlet of stacked cells (10). It essentially comprises a distribution box (20), a collection box (30) and a concentric stack of elementary cells (10) intercalated with interconnectors (12). An upper seal (50) is placed at the outlet of the cells (10) into which penetrate the walls (38) of the collection box (30). Inner (44) and outer (45) ferrules form tanks at the outlet of the chambers and themselves open into cavities (37) formed by the walls (38). The invention applies to SOFC type fuel cells and SOEC type electrolysers.

8 Claims, 3 Drawing Sheets

TUBULAR FUEL CELL MODULE AND THE SEALING DEVICE THEREOF

TECHNICAL FIELD

The invention concerns fuel cells and, in particular, those operating at high temperature such as SOFC (Solid Oxide Fuel Cell) type fuel cells but also SOEC (Solid Oxide Electrolysis Cell) type electrolysers.

PRIOR ART AND PROBLEM POSED

SOFC type fuel cells operate with oxygen and hydrogen as combustibles, or with another combustible gas, for example of the methane type, and at temperatures between 500 and 1 000° C. These cells are formed of a stack of several elementary cells connected by connection elements such as interconnectors or bipolar plates. Each elementary cell is itself formed of a stack of a cathode, an electrolyte and an anode. The high temperature is necessary to obtain a sufficient conductivity of the electrolyte in $O_2$ ions.

In coaxial architecture, the stack of different elementary cells of fuel cells is concentric, each elementary cell itself being connected to the other by an interconnector.

FIG. 1 represents a type of tubular structure comprising essentially a concentric stack 2 of several elementary cells 6 of fuel cells intercalated with interconnectors 1. At each end of the stack is a flange 4 or 5 having, either an oxygen and hydrogen distribution network as the lower base flange 5, or a residual gases collection network as the upper flange 4. Moreover, between the upper part of the stack 2 and the upper flange 4, a seal 3 formed of a disc of ceramic wool compressed between these two elements is used. It thereby creates a loss of head between the different chambers of the circuit of the combustible gases and also has a function of absorbing the expansion differences between the different constituent elements of the stack, particularly the cells and the interconnectors, the latter being metallic.

Nevertheless, it turns out that this seal does not assure a perfect sealing. Indeed, a fraction of the gases mixes and burns. This imperfection may nevertheless be used so as to heat the re-entering gases, if necessary. On the other hand, this input of heat may be superfluous under certain operating conditions. This leak at the outlet of the apparatus then becomes a defect detrimental to the output of the fuel cell module.

The aim of the invention is to provide a remedy for these drawbacks in order to recover the reclaimable gases at the outlet of the apparatus and thereby to improve its output. For SOFC fuel cells, the gases present are unconsumed hydrogen at the anodic chamber outlet and oxygen at the cathodic chamber outlet, and for SOEC type electrolysers the gases present are hydrogen produced at the cathodic chamber outlet and oxygen plus a vector gas at the anodic chamber outlet.

It has the further aim, in the context of SOFC fuel cells, as in that of SOEC type electrolysers, of reducing the risk of failure brought about by an uncontrolled combustion due to the mixture of the two gases and thereby to absorb the expansion difference of the different components.

SUMMARY OF THE INVENTION

To this purpose, the main subject of the invention is a fuel cell module composed of a tubular stack of elementary cells intercalated with interconnectors and comprising for each stage relative to a cell:
an interconnector;
an anodic chamber;
an elementary cell;
a cathodic chamber, the module being completed by two distribution and collection boxes at the two ends of the stack, of which an upper box and a lower box and a sealing device formed of an upper seal between the stack and the upper box. It should be pointed out that the glass at the operating temperature is in the paste state. The tubular shapes of the upper box are "immersed" in the glass but do not compress it.

According to the invention, the sealing device is completed by a lower surface of the upper box that has concentric tubular walls, namely two for each stage relative to a cell, which are immersed in the upper seal, the anodic and cathodic chambers being terminated by tanks each formed of an inner tubular ferrule and an outer tubular ferrule containing the upper seal and opening by pairs inside a cavity of the upper box.

In a preferential embodiment of the invention, the seal is in glass.

In the same way, in a principal embodiment of the invention, the tubular structure of the module is cylindrical.

In a first version of the module according to the invention, the lower box is a distribution box, a lower seal being placed between the base of the stack and the upper surface of the lower box, and the upper box is a gas collection box.

In this case, the distribution means of the distribution box are formed of at least two annular channels opening into at least two radial channels through passages and opening themselves onto one face of the stack through distribution passages intended to supply the electrodes by the anodic and cathodic chambers.

In this case, the collection means of the collection box are formed by at least two radial channels opening onto the surface opposite the stack by collection passages and opening onto an outer surface through annular channels, for the outlet of the residual gases.

In the second version of the module according to the invention, the lower and upper boxes are each effective for the distribution and the collection for one of the two combustible gases.

In this second case, the distribution means of the two boxes are formed, for each box, of at least one radial channel opening onto one face of the stack through distribution openings intended to supply the electrodes by the anodic and cathodic chambers.

In the same way, in this case, the collection means of the two boxes are formed of at least one annular channel on the surface opposite the stack and outlet openings on an outer surface and opening into the annular channel for the outlet of the residual gases.

It is advantageous to use a support tube at the centre of the stack assuring the centring as well as the support of the upper box.

BRIEF DESCRIPTION OF DRAWINGS

The invention and its different technical characteristics will be better understood on reading the detailed description that follows and by referring to the appended figures, presenting respectively.

DETAILED DESCRIPTION OF SPECIFIC EMBODIMENTS

Figure 1:
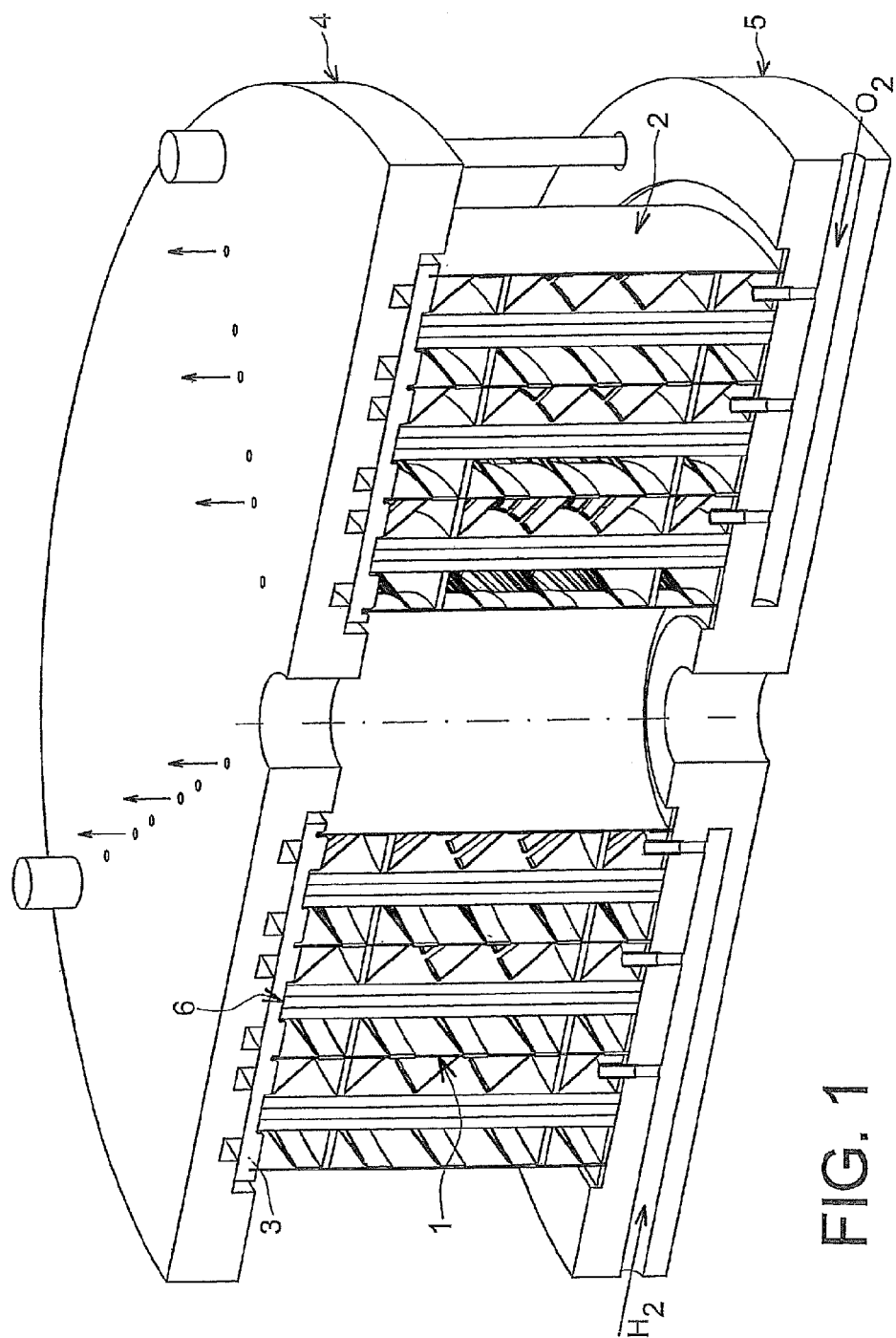
FIG. 1, in section, already described, a fuel cell element according to the prior art.
Figure 2:
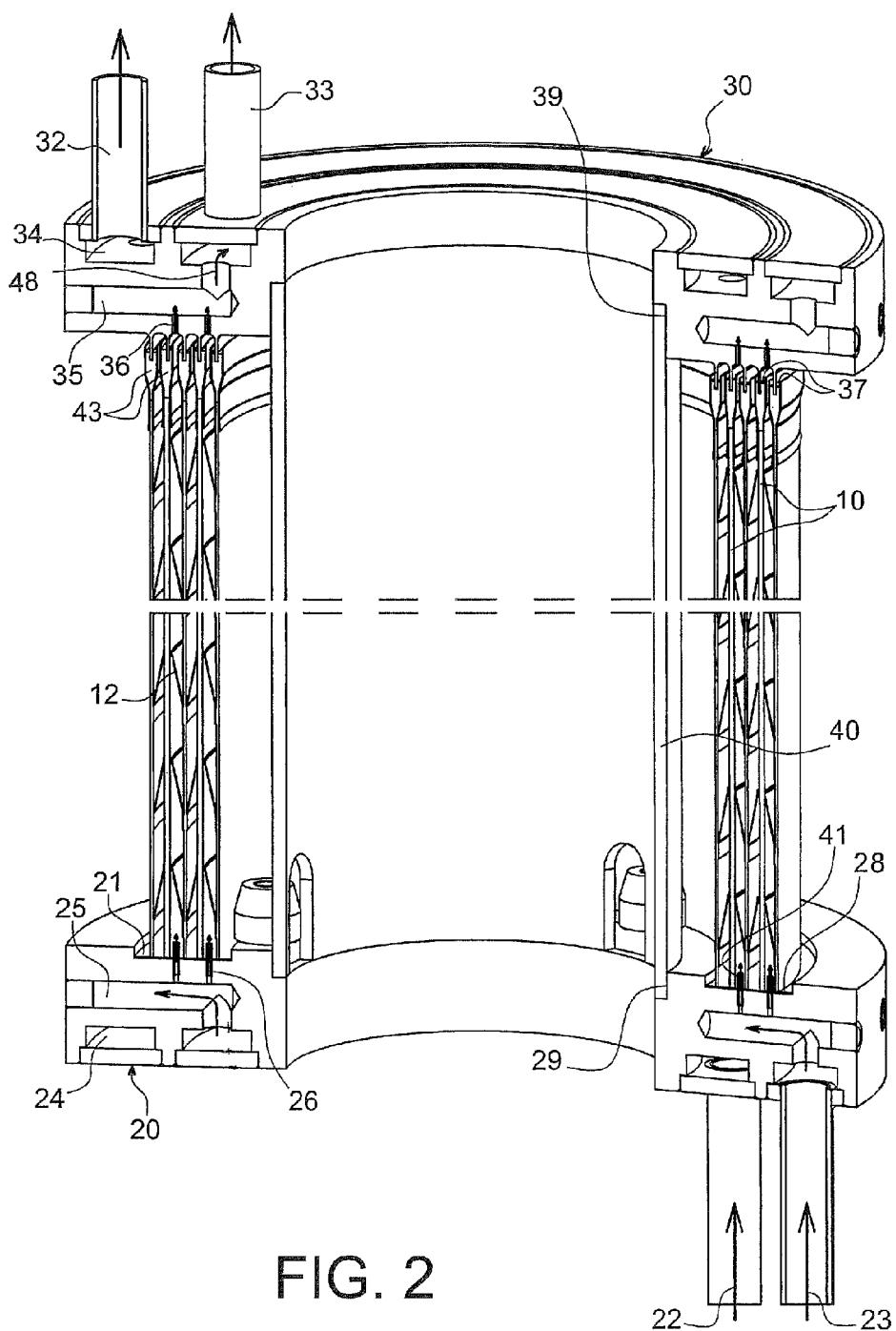
FIG. 2, in section, a fuel cell element according to the invention.

In reference to FIG. 2, the module according to the invention essentially comprises a distribution box 20, which is here the lower box serving as base to a concentric stack of elementary cells 10 and a collection box 30 that is here the upper box, crowning the stack of cells 10. The assembly is completed by a support and centring tube 40 placed at the centre of the concentric stack of cells 10. This support and centring tube 40 is placed in an inlay 29 of the distribution box 20 and in an inlay 39 of the collection box 30. The stack of cells 10 is placed in a groove 21 of the distribution box 20, with a lower seal in glass 27 as a complement. In its upper part, the stack of cells 10 is placed in cavities 37 formed on the lower surface of the collection box 30. More precisely, in their upper part, each cell 10 and each interconnector has a flared section 43 placed between two walls forming the cavity 37. The detail of this installation will be described in reference to FIG. 3.

The distribution box 20 has inlet conduits 22 and 23 for the combustible gases that cross it through two circular channellings 24, and a passageway as denoted by the arrow in FIG. 2 which opens into at least one radial channel 25. Passages 26 enabling the gas to be distributed in the anodic and cathodic chambers are placed on either side of each of the cells 10.

Capillary tubes 41 are placed in the extension of the interconnectors 12. They are fitted into spot facings, in order to avoid the obstruction of supply channels by the lower seal 28, in glass. The lower face of the cells 11 and the interconnectors 12 and in contact with the lower seal 28, in glass, placed in the groove 21 of the distribution box 20.

In a similar manner, passages 36 are arranged opposite the outlets of these anodic and cathodic chambers, in the collection box 30. Thus, the residual gases are captured by at least one radial channel 35 and are sent towards outlet conduits 32 and 33 through passages 48 and circular channellings 34.

As the circulation of the arrows shows, the circulation of the gases takes place overall in an ascending or descending vertical manner. In the embodiment described in FIG. 2, it takes place in a co-current manner, but it may also be envisaged as counter-current.

Figure 3:
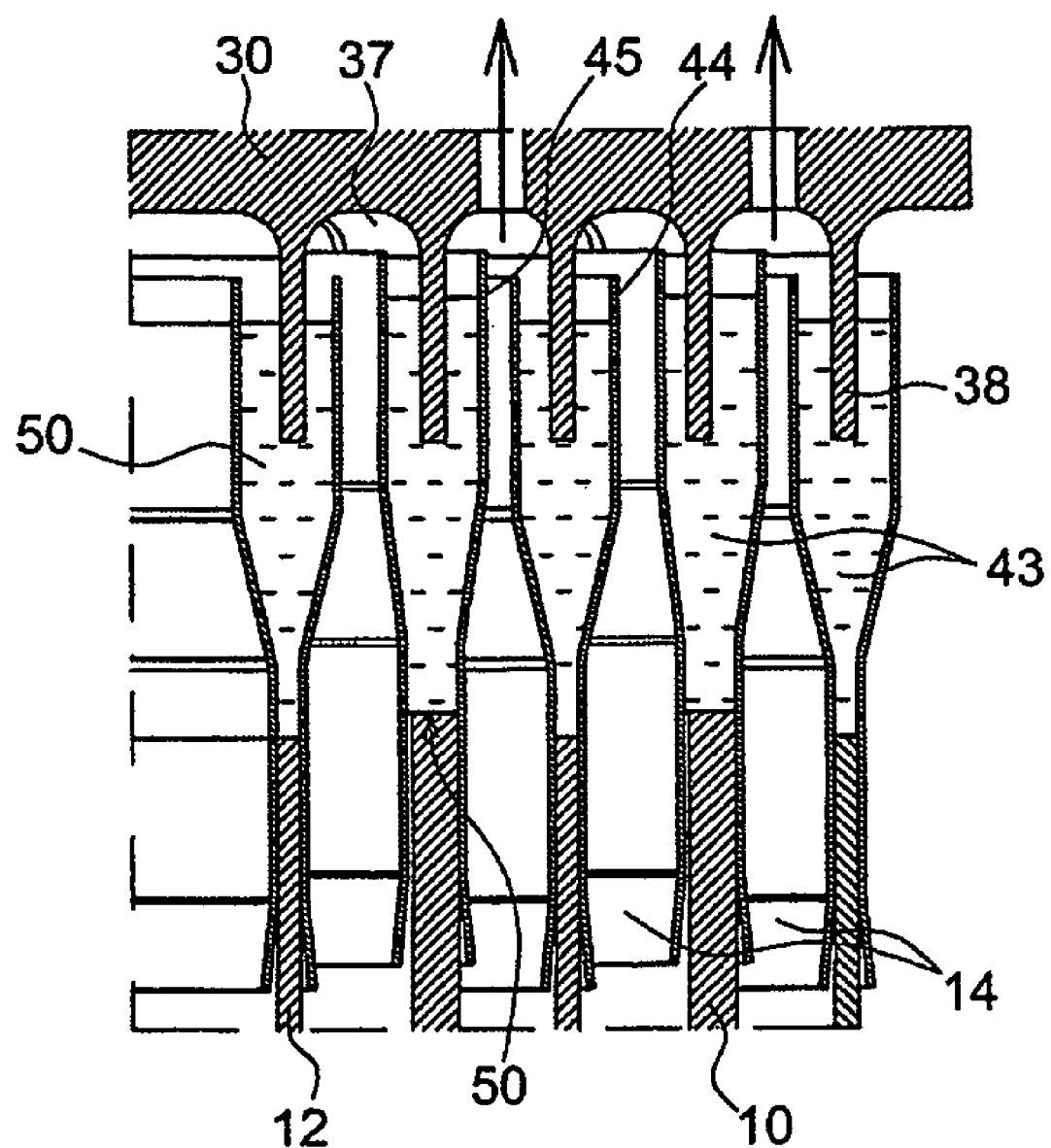
FIG. 3, in section, the sealing device of the fuel cell module according to the invention.

Concerning the sealing device specific to this module, in FIG. 3, are shown the collection box 30, more precisely its lower part, the cavities 37 formed by the walls 38 that are concentric. Also visible are the flared sections 43 formed by an alternation of an inner ferrule 44 and an outer ferrule 45, the ends of which are slightly offset to form these flarings. The inner ferrule 44 and the outer ferrule 45 of each flared section 43 are placed alongside one another extending into two adjacent cavities 37. In other words, the anodic and cathodic chambers 14 surrounding each cell 10 each open into one of the cavities 37. In this FIG. 3 are also shown the interconnectors 12 that are placed in a concentric manner and intercalated between the cells 10, which are also concentric.

The sealing of this module at this level is assured by an upper seal 50, in glass, pushed into the assembly formed of the stack of cells 10 and interconnectors 12 at the level of the tanks 43. This upper seal 50 therefore blocks the ends of the interconnectors 12 and cells 10 over quite a sizeable thickness. In addition, it may be noted that the walls 38, which form the cavities 37, are also pushed into the seal 50.

The inner 44 and outer 45 ferrules are obtained from a metal strip, for example in nickel based or iron based alloy, rolled and welded. More precisely, the inner 44 and outer 45 ferrules that crown the interconnectors 12 are formed from the same material as this and may be either fitted together or welded at the end of the tube. In the case where they are fitted together, they have an additional shape that acts as axial stop piece. The inner 44 and outer 45 ferrules that crown the cells 10 are formed from a material having an expansion coefficient as close as possible to that of the cells 11. They are fitted together and have a shape that acts as axial stop piece.

Concerning the end sealing of the cells 10, the cold diameters of the inner 44 and outer 45 ferrules are determined so as to have, whatever the temperature, play between each cell 11 and their inner 44 and outer 45 ferrules. This play must be dimensioned in order to eliminate any radial stress that could lead to the failure of the cell 10, while assuring the confinement of the glass forming the seal 50.

To limit corrosion and short-circuiting problems, the inner 44 and outer 45 ferrules may be coated by means of a material resistant to corrosion and being an electrical insulator, for example zirconia.

The collection box 30 is metallic or ceramic. It is formed of a material having the expansion coefficient the closest possible to the cells 10, so as to limit stresses during the transitory thermal phases, for temperatures below the glass transition temperature of the glass forming the seal 50.

The cells 10, of tubular shape, are formed by a plasma deposition or by any other ceramic part manufacturing method. Since they have increasing radii, they are assembled one against the other. It is pointed out that their axis in operating position is vertical.

The interconnectors 12 are also tubular and metallic. It will be recalled that they assure the separation of the gases and the placing in series of the cells 10 by means of strips mounted on them by welding or brazing.

The invention claimed is:

1. Fuel cell module composed:
  of a tubular stack of elementary cells (10), intercalated with interconnectors (12), the module comprising for each stage relative to a cell (10):
    an interconnector (12);
    an anodic chamber (14);
    an elementary cell (10),
    a cathodic chamber,
  two distribution and collection boxes (20, 30) placed at the two ends of the stack, one box (30) of which is upper and one box (20) which is lower, and
  a sealing device formed of an upper seal (50), situated between the stack and the upper box (30), characterised in that the sealing device is completed by a lower surface of the upper box (30), which has, for each stage relative to a cell (10), two tubular concentric walls (38) that are immersed in the upper seal (50), the anodic (14) and cathodic (14) chambers being terminated by flared sections (43), each formed of an inner tubular ferrule (44) and an outer tubular ferrule (45), with each flared section containing the upper seal (50) and opening into a cavity (37) of the upper box (30).

2. A fuel cell module according to claim 1, characterised in that the upper seal (50) is formed of glass.

3. A fuel cell module according to claim 1 or 2, characterised in that the structure of the module is cylindrical.

4. A fuel cell module according to claim 1, characterised in that the lower box is a distribution box (20) completed by a lower seal (27) placed between the stack and the distribution box (20), and in that the upper box and a collection box (30) are completed by the upper seal (50).

5. A fuel cell module according to claim 1, characterised in that the lower and upper boxes each form a distribution box for a first gas and a collection box for a second gas.

6. A fuel cell module according to claim 4, characterised in that it comprises distribution means of within the distribution box (20) formed of at least two annular channels (24) opening into at least two radial channels (25) themselves opening onto one surface of the stack through distribution passages (26) intended to supply the electrodes of the cells (10) through anodic and cathodic chambers (14).

7. A fuel cell module according to claim 4, characterised in that it comprises collection means of the collection box (30) formed of at least two radial channels (35) opening onto the surface opposite the stack by collection passages (36) and opening onto the outer surface of the collection box (30) through annular channels (34) and outlet passages (38) for the outlet of residual gases.

8. A fuel cell module according to claim 1, characterised in that it comprises a support and centering tube (40), placed at the center of the stack.

* * * * *